US008672683B2

(12) United States Patent (10) Patent No.: US 8,672,683 B2
Long et al. (45) Date of Patent: Mar. 18, 2014

(54) COMPUTER-BASED ABACUS TRAINING SYSTEM

(75) Inventors: Steven Nelson Long, Salt Lake City, UT (US); Cary David Belt, Salt Lake City, UT (US); Craig Golightly, Salt Lake City, UT (US); James Lisonbee, Salt Lake City, UT (US); Gregory Oaks, Salt Lake City, UT (US); Mark Hildor Nelson, Salt Lake City, UT (US)

(73) Assignee: Senapps, LLC, Salt Lake City, UT (US)

( * ) Notice: Subject to any disclaimer, the term of this patent is extended or adjusted under 35 U.S.C. 154(b) by 172 days.

(21) Appl. No.: 13/015,500

(22) Filed: Jan. 27, 2011

(65) Prior Publication Data

US 2011/0151417 A1 Jun. 23, 2011

Related U.S. Application Data

(63) Continuation of application No. PCT/US2009/051303, filed on Jul. 21, 2009.

(60) Provisional application No. 61/085,333, filed on Jul. 31, 2008.

(51) Int. Cl.
*G09B 19/02* (2006.01)
*G09B 7/00* (2006.01)

(52) U.S. Cl.
USPC ............................ 434/203; 434/191; 434/323

(58) Field of Classification Search
USPC .................................. 434/191, 201, 203, 162
See application file for complete search history.

(56) References Cited

U.S. PATENT DOCUMENTS

| 3,731,401 | A | * | 5/1973 | Kojima ........................ 434/203 |
| 5,059,127 | A | * | 10/1991 | Lewis et al. ................... 434/353 |
| 5,533,903 | A | * | 7/1996 | Kennedy ................... 434/307 R |
| 5,827,066 | A | | 10/1998 | Henter |
| 6,287,123 | B1 | * | 9/2001 | O'Brien ....................... 434/118 |
| 6,484,010 | B1 | * | 11/2002 | Sheehan ....................... 434/362 |
| 6,712,614 | B1 | * | 3/2004 | Henderson .................... 434/203 |
| 6,801,751 | B1 | | 10/2004 | Wood et al. |
| 7,395,027 | B2 | * | 7/2008 | Seitz et al. .................... 434/350 |
| 2002/0197589 | A1 | | 12/2002 | Wood et al. |
| 2003/0073069 | A1 | * | 4/2003 | Selick et al. ....................... 435/4 |
| 2005/0130106 | A1 | * | 6/2005 | Ho ................................. 434/201 |
| 2009/0164935 | A1 | * | 6/2009 | Feigenbaum et al. ........ 715/780 |

FOREIGN PATENT DOCUMENTS

JP 2002258730 A * 9/2002 ............... G09B 5/08

OTHER PUBLICATIONS

Anonymous. "Abacus Works—A Bead Calculation Software." May 18, 2004. Retrieved from <URL: http://www.typoscriptics.de/soroban/AbacusWorks.html>.*

(Continued)

*Primary Examiner* — Kathleen Mosser
*Assistant Examiner* — Peter J Alley
(74) *Attorney, Agent, or Firm* — Kirton McConkie

(57) ABSTRACT

A computer-based abacus training system is provided. The system can include a simulated abacus display, means for outputting problems to be solved by a user, means for accepting input from the user, and means for checking the user's solution. Display can be of a simulated abacus, simulated hand movements, or both. Conversion between text-form and abacus-form representations can be included.

27 Claims, 6 Drawing Sheets

(56) References Cited

OTHER PUBLICATIONS

Yin, Jun; Wang, Ye; Hsu David. "Digital Violin Tutor: An Integrated System for Beginning Violin Learners". National University of Singapore: School of Computing. Nov. 2005.*

Abacus Works—A Bead Calculation Software, http://www.typoscriptics.de/soroban/AbacusWorks.html, pp. 1-2, May 18, 2004.

PCT Search Report and Written Opinion PCT/US2009/051303 (Feb. 16, 2010).

* cited by examiner

COMPUTER-BASED ABACUS TRAINING SYSTEM

The present application is a continuation of and claims the benefit of International Application Serial No. PCT/US/2009/051303, filed on 21 Jul. 2009, which claims the benefit of U.S. Provisional patent application Ser. No. 61/085,333, filed on Jul. 31, 2008, each of which is hereby incorporated by reference in its entirety.

FIELD

The present application relates to computer-based training systems. More particularly, the present application relates to techniques for computer-based training in using an abacus and associated techniques.

BACKGROUND

The abacus, known also by other names, such as soroban (Japan), suanpan (China), supan (Korea), and schoty (Russia), is still in everyday use in parts of Asia. An abacus can be easily manufactured and does not require electrical power for operation. Even with the prevalence of pocket calculators, many individuals prefer the abacus, and are highly proficient in its use.

Use of the abacus in teaching mathematics is believed to be helpful because the abacus provides for a visual representation of numbers. This visual representation can make it easier to learn the concepts behind number systems and performing arithmetic. Concepts such as decimal points, place value, carrying, borrowing, and the like are translated from abstract ideas into physical operations that can be observed on the abacus. Moreover, proficiency in performing calculations on an abacus can be translated into proficiency in performing mental arithmetic by visualizing the abacus while performing the calculations.

In recognition of the benefits the abacus can provide in teaching mathematic concepts, some schools use the abacus in basic arithmetic classes. In addition, many different abacus training schools have become available to enable individuals to develop proficiency in abacus use.

Traditional teaching in an abacus school relies on an expert instructor. To check the student's progress, the instructor observes each individual's manipulations of the beads. This observation is necessary, as it is often not sufficient to look at the final result obtained to determine if the student is performing operations correctly (particularly when the student makes errors). Unfortunately, this requires intensive use of the instructor during early phases of training, limiting the number of students that can be taught simultaneously.

As students progress, drills are performed by calling out numbers and operations to be performed on the abacus. The students perform the calculations, and then check that they have obtained correct results. While these drills can improve student's speed, little feedback is obtained when errors are made as to what the student did wrong to cause the error. Moreover, since no permanent record of the operations performed on the abacus remains, it is difficult to determine the cause of the error, even when the student is making systematic errors.

While some attempts to provide computer-based abacus training have been made, to date most available systems are very rudimentary and lack many desired features.

SUMMARY

Accordingly, techniques for computer-based abacus teaching have been developed.

In some embodiments of the invention, a method of providing a simulated abacus display in a computer-based abacus training system is provided. The method can include accepting an input text string comprising numerical values and mathematical operations displayable on an abacus. The method can also include parsing the input text string to extract the numerical value and the mathematical operations. The method can also include converting the numerical values into abacus-form representations and converting the mathematic operations into a corresponding series of bead movements. Another operation of the method can include generating an animation of an abacus using the abacus-form representations and the corresponding series of bead movements. The method can also include displaying the animation on a display.

In some embodiments of the invention, a computer-based method for training a user in the operation of an abacus is provided. The method can include generating a series of mathematical problems to be solved to the user, and presenting the mathematical problems to the user for solution, wherein each mathematical problem has a corresponding solution using an abacus. The method can also include accepting user input describing the operation of an abacus to solve the series of mathematical problems. The method can further include comparing the user input to the corresponding solution to determine the accuracy of the user input, formulating a measure of user mastery based on the accuracy of the user input, and adjusting the series of mathematic problems to be solved based on the measure of user mastery.

In some embodiments of the invention, a computer-based method for training a user in the operation of an abacus is provided. The method can include generating a series of mathematical problems and converting the mathematical problems into corresponding hand movements for manipulation of beads of an abacus. The method can include generating animations of the corresponding hand movements and displaying the animations to a user. The method can also include accepting user input describing the mathematical problems. The method can further include comparing the user input to the mathematical problems to determine the accuracy of the user input, formulating a measure of user mastery based on the accuracy of the user input, and adjusting the series of mathematical problems based on the measure of user mastery.

In some embodiments of the invention, a method for displaying simulated abacus operations on a computer-driven display is provided. The method can include accepting a string of abacus operations to be display and converting the string of abacus operations into corresponding hand movements for manipulation of beads of the abacus. The method can also include generating animations of the corresponding hand movements and displaying the animations on the computer-driven display.

In some embodiments of the invention, an abacus training system is provided. The system can include a user interface device having a user input device and an output device. A processor can be coupled to the user interface device. An instruction memory can be coupled to the processor, and the instruction memory can have processor-executable instructions for causing the processor to implement a computer-based method for training a user in the use of an abacus.

In some embodiments of the invention, a computer program product is provided. The computer program product can include a computer-readable medium having computer-executable instructions thereon for causing a computer to implement a computer-based method for training a user in the use of an abacus.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Figure 1:
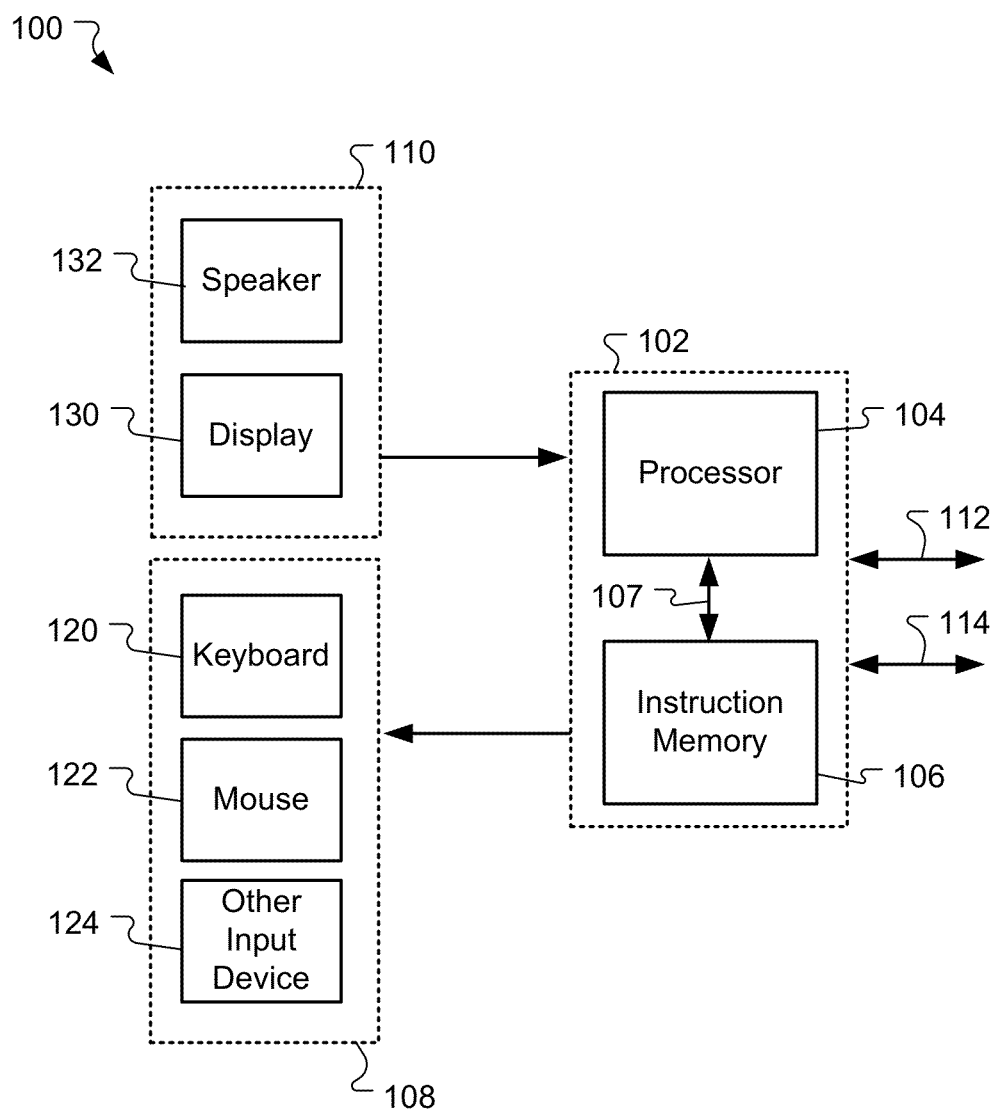
FIG. 1 is a block diagram of a computer-based abacus training system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a bead includes reference to one or more beads.

Numerical data may be expressed or presented herein in a range format. It is to be understood that such a range format is used merely for convenience and brevity and thus should be interpreted flexibly to include not only the numerical values explicitly recited as the limits of the range, but also as including all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

It has been recognized by the present inventors that a computer-based training system for the abacus could help to reduce the drawbacks of traditional live abacus instruction. Existing computer-based systems, however, have limited capabilities.

For example, existing systems do not provide instruction in the proper position and use of the hands, and provide no ability to check user comprehension of proper hand and finger movement technique. Accordingly, in some embodiments of the present invention, display of the hand movements to perform abacus operations can be provided. In some embodiments of the present invention, hand movements can be displayed without the corresponding abacus bead movements and the user can be tested on their comprehension of the operations corresponding to the hand movements.

As another example, existing systems do not provide ability to adapt to the training needs of individual users. Different individuals, however, progress at different rates. Some students may struggle with different concepts and grasp other concepts quickly. Accordingly, in some embodiments of the present invention, tutorials and practice problems can be presented based on a measure of the student's mastery of different skills.

As another example, existing system do not provide the ability to accept input and output in alternatively text form and abacus form. Accordingly, in some embodiments of the present invention, text form representations of mathematical problems can be translated into abacus-form representations of numbers and abacus operations. The abacus-form representations and abacus operations can be displayed to the user. The abacus operations can be displayed with or without the corresponding hand movements, or the hand movements alone displayed, as mentioned above.

Turning to FIG. 1, an abacus training system in accordance with some embodiments of the present invention is illustrated in block diagram form. The system, shown generally at 100, can include a computer system 102, which can be a general-purpose or special-purpose computer system. For example, the computer system can be a personal computer, a notebook computer, a personal digital assistant (PDA) or other hand-held device (e.g., a cellular telephone), a workstation, a mini-computer, a mainframe, a supercomputer, a multi-processor system, a network computer, a processor-based consumer electronic device, or the like. The computer system can include a processor 104 which is capable of executing computer-executable instructions received from an instruction memory 106 via a bus 107 or similar interface. The processor can be a single processor or multiple processors (e.g., a central processor and one or more other processors designed to perform a particular function or task). The instruction memory may be integrated into the same semiconductor device or package as the processor. The bus can be configured to connect various components of the computer system, and can include any of a variety of bus structures including a memory bus or memory controller, a peripheral bus, or a local bus that uses any of a variety of bus architectures. The bus can be used to interconnect the processor, instruction memory, and other components, such as mass storage devices, input/output interfaces, network interfaces, and the like.

As describer further below, computer-executable instructions can cause the processor 104 to coordinate operation of the abacus training system. The computer-executable instructions can be permanently stored in the instruction memory 106 or temporarily stored in the instruction memory and loaded into the instruction memory from a computer-readable medium, for example, via an interface 112. The computer-executable instructions can include data structures, objects, programs, routines, or other program modules that can be accessed by the processor. For example, computer executable instructions can include operating system instructions used to establish communication or enable loading of programs, such as during start-up of the computer system. In general, computer-executable instructions cause the processor to perform a particular function or group of functions and are examples of program code means for implementing methods disclosed herein. Furthermore, a particular sequence of the executable instructions provides an example of corresponding acts that can be used to implement the operations of such methods.

Examples of computer-readable media include random-access memory (RAM), read-only memory (ROM), programmable read-only memory (PROM), erasable programmable read-only memory (EPROM), electrically-erasable programmable read-only memory (EEPROM), compact disk read-only memory (CD-ROM), digital video disk (DVD), magnetic medium, or any other device or component that is capable of providing data or executable instructions that can be accessed by a processor.

The computer system 102 can include various input/output interfaces, including for example interfaces to input devices 108 and output devices 110. Various types of input devices can be used, including for example a keyboard 120, a mouse 122, or other 124 input device types (e.g., a trackball, a light pen, a stylus, a joystick, or other pointing devices; a tablet or touch pads; an abacus controller; a game controller; a microphone; a digital camera; and the like). Examples of interfaces that can be used to connect input devices to the computer system include a serial port, a parallel port, a game port, a universal serial bus (USB), a firewire port (IEEE 1394), and the like. Output devices can include a display 130, a speaker 132, or other output devices (e.g., a printer and the like). Examples of interfaces that can be used to connect output devices to the computer system include a video adapter, an audio adapter, a parallel port, and the like. Not all input device types and output device types illustrated in FIG. 1 or described herein need to be included, and a system can include one or more of differing input devices and output device types, and one or more of each input or output device type.

The computer system 102 can include a network interface 114 to enable the system to exchange information with one or more other local or remote computers. Network interfaces can include wired and wireless links, including for example connection to a local area network (LAN), a wide area network (WAN) (e.g. the Internet), a modem, wireless link, or the like. In a networked system, accessible program modules or portions thereof can be stored in a remote memory storage device and transferred through the network for loading into the instruction memory 106. Furthermore, in a networked system the computer system can participate in a distributed computing environment, where functions or tasks are performed by a plurality of networked computers. For example, a client-server architecture can be used wherein some functions are performed by the local client computer system and other functions are performed by a remote server computer, with operation of the local client computer system and the remote server computer coordinated through the network connection. The server computer can include an architecture generally similar to the computer system, and thus need not be described further.

Turning to the operation of the abacus training system, various modes of operation can be provided in accordance with some embodiments of the invention. For example, the system can operate in teaching modes, exercise modes, testing modes, and combinations thereof.

In a teaching mode, the system can demonstrate the operation of a simulated abacus on the display, animated hands showing how the beads are physically manipulated, and both the simulated abacus and animated hands, as described further below.

In an exercise mode, the system can present problems to be solved by the user and check the accuracy of the user solution. For example, the system can present a problem in text form, and check the user's solution input using a displayed abacus control or abacus controller device (e.g., as discussed further below). As another example, the system can display a series of hand movements (without the corresponding movement of the abacus beads) and check the user's text input describing the operation performed. As yet another example, the system can display a series of hand movements and check the user's inputted abacus bead manipulations. User mistakes can trigger tutorials or additional exercises to reinforce correct procedures.

In a test mode, the system can present problems in various formats (e.g., via display of a math problem in text, abacus, or hand movement format, etc.), accept user input (e.g., math text input, abacus bead movements, etc.) and check the user input for accuracy. Additional detail and examples for the various the modes of operation are provided by the below examples.

Figure 2:
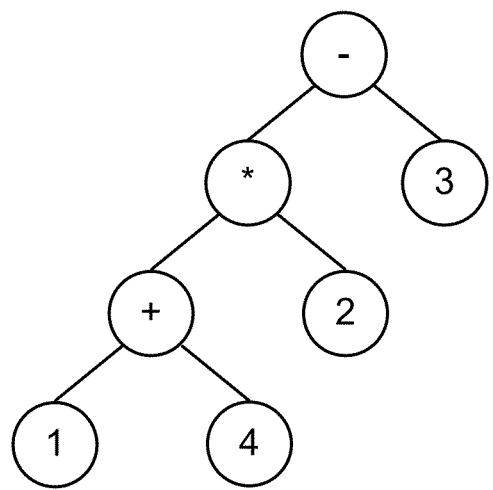
FIG. 2 is an illustration of a tree form representation of an input string in accordance with some embodiments of the present invention.

In some embodiments, the invention can provide for conversion of an input text string into corresponding abacus operations. For example, the input text string can include numerical values and mathematical operations displayable on an abacus. As a particular example, an input text string can be "3+4−2". The input text string can be parsed by the system to extract the numerical values and the mathematical operations. The input text string can be broken into individual tokens, and each token categorized by type (e.g., a "number" or a "mathematical operator"). The input string can be represented in a tree form, where nodes of the tree correspond to the numerical values and branches in the tree correspond to operations. For example, a complex expression of the form "(1+4)*2−3" can be represented in tree form as illustrated in FIG. 2.

Figure 3:
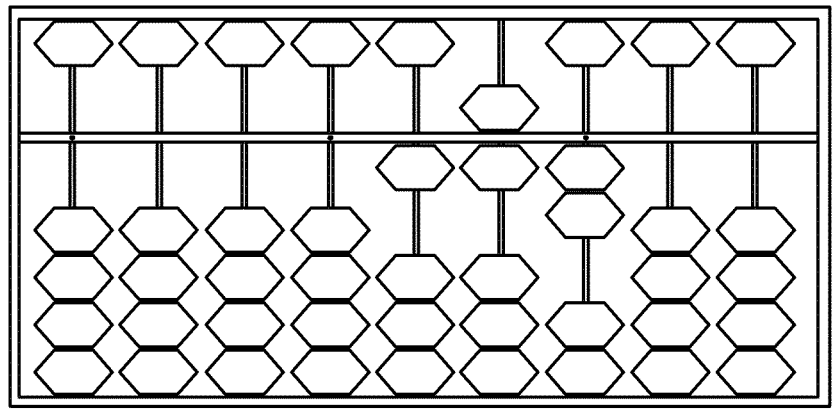
FIG. 3 is an illustration of an abacus form representation of the number 162.

Numerical values can be represented in abacus form. As is known, a Japanese-style abacus can be used to represent base-10 numbers using each rod for a different digit of the number. Beads below the bar (sometimes called earth beads) have values of 1, and beads above the bar (sometimes called heaven beads) have values of 5. Beads are slid toward the bar to represent values. Hence, values of 1 through 4 are represented by sliding 1 to 4 of the earth beads upwards, and values of 5-9 are represented by sliding 1 to 4 of the earth beads upwards and the heaven bead downward. Zero is represented by all of the beads being slid away from the bar. For example, the number 162.00 is represented on a Japanese-style abacus as illustrated in FIG. 3.

Of course, other abacus styles and number systems can also be used, and rules for representing numbers in various systems are well known. For example, an abacus can be used for base 5, base 16, base 20, and other base systems, depending on the number and arrangement of beads. Accordingly, in some embodiments of the invention, rules describing number representation on differing abacus types using different bases can be included in the system to enable conversion of numbers into differing abacus form representations.

Mathematical operations can be described as a series of bead movements. Various different techniques for performing mathematical operations on an abacus are known which can be encoded into the system. For example, addition of two numbers A and B can be described as follows:

Each number is decomposed into individual place-valued digits, such as A100, A10, and A1; B100, B10, and B1. For example, 162 is represented by A100=1, A10=6, A1=2. The place-valued digits of A are placed on the abacus, for example, A100, A10, and A1 are presented on consecutive rods, from left to right (e.g., as shown in FIG. 3). Then proceeding from left to right, the place-valued digits of B are added to each place-valued digit of A on a rod-by-rod basis. Addition can be performed by adding the place-valued digit of B, or in the case of a carry, subtracting the complement of the place-value digit of B and adding one (a carry) to the previous rod.

Other mathematical operations can be performed on an abacus as well, including for example, subtraction, multiplication, division, and extracting square roots, using known techniques. The abacus can be used to store several numbers simultaneously at different positions on the abacus which are used in the calculations.

Various ways of representing mathematic operations in the system can be used. For example, the mathematical operations can be stored in a database. The database can also include hierarchical representations, wherein some mathematical operations are described in terms of other mathematical operations.

For example, mathematical concepts can be defined by objects within the database. A quanta can be defined as single digit number from 0 to 9. An atom can be defined as two quanta that are added or subtracted from one another. A molecule can be defined as a multi-digit number represented by multiple quanta. A grouping of quanta and atoms can define a family, corresponding to a particular subject in the curriculum. As described further below, the user can be provided tutorials and exercises drawn from particular subjects.

An animation of an abacus being used to evaluate the mathematical expression can be generated from the abacus-form representations and corresponding series of bead movements. For example, the bead movements can be applied to the abacus-form representations of the numerical values to obtain a series of animated bead movements and abacus representations. The animations can be displayed on the display. Additional examples and description of animation displays are provided below.

One aspect of a training regimen can include guiding presenting the user practice problems. For example, in some embodiments of the present invention the system can output a series of mathematic problems (solvable on an abacus) to the user. The output can be a text representation, an audio representation, or other form. For example, the system can output text string representations of mathematic problems on a display (e.g., displaying "3+4−2+1"). As another example, the system can use a voice synthesizer or recorded voice segments to provide audio instructions (e.g., "add two", "subtract seven" and "divide by three"). As yet another example, problems can be presented on an animated abacus, or just the hand movements displayed (as described further below).

Problems can be output in a practice scenario, where a problem is presented, and the system waits for the user to enter a solution. Alternately, in an examination scenario, problems can be presented with a predefined timing, regardless of whether the student has entered a response or not. Presenting timed drills or tests can be helpful in developing increased speed.

Problems can be selected from various categories of problems types (curriculum subjects), and if desired, parameters of the problems can be selected randomly. For example, addition problems can be presented, wherein the operands are generated randomly. As another example, a mixture of addition and subtraction problems can be presented, wherein the type of problem (addition or subtraction) is selected randomly. Various parameters of the problem generation can be controlled to achieve a desired training curriculum (e.g., as described further below).

The system can accept user input describing the operation of an abacus to solve the series of mathematical problems. The user input can, for example, be provided by mouse manipulations of a displayed abacus control or picking of icons from a palette. As another example, the user input can be provided via an abacus controller, a game controller, or similar device which allows the user to manipulate actual beads of an abacus or similar type device. As yet additional examples, user input of alphanumeric text via a keyboard can be used or handwritten input can be accepted from a user (e.g., via a tablet or touchpad) and translated into corresponding alphanumeric text. As noted above, more than one number may be input onto the abacus, for example, when performing multiplication or division.

The mathematical problems presented to the user can each have one or more corresponding solution approaches using an abacus. The accuracy of the user's input solution can thus be checked by comparing it to the corresponding solution. For example, comparing the user input to the corresponding solution can be performed by checking each individual bead movement input by the user against individual bead movements in the corresponding solution. The user can be provided immediate feedback regarding the accuracy of their input (e.g., in a training or practice mode), praise for correct answers, remedial instruction if a large number of incorrect answers have been entered. The system can also create a score (e.g., in a test mode).

Checking individual bead movements of the user can be beneficial in that errors can be identified and immediate feedback to the user can be provided. This can help to avoid reinforcement of erroneous usage. This can also help in distinguishing between mathematical errors and abacus operation errors.

In some cases, there is more than one possible correct solution. Furthermore, when working complex problems, there may be more than one correct procedure to arrive at the correct solution. As another example, in some situations, a user may be able to enter a sequence of movements and then undo some movements that were made and thus arrive at a correct solution. Accordingly, in may not always be possible to specify a single sequence of correct bead movements.

If desired, comparison of user input can be performed using Bayesian techniques. For example, a Bayesian network can be formed having nodes corresponding to the various mathematical concepts (e.g., quanta, atoms, and molecules as described above). Mathematical problems can be defined in terms of templates corresponding to the various nodes, and the user input pattern matched to the nodes. The results from the pattern matching can be submitted as evidence to the Bayesian network. The Bayesian network can be evaluated to provide updated probabilities associated with the nodes. For example, the probabilities can correspond to a probability the user correctly understands or can correctly apply the mathematical concept associate with the node. The node probabilities can thus be used to form a measure of user mastery.

In performing the pattern matching, various different types of matches may be obtained. For example, a matching type may be any of:

Verbatim—Exact match to target or goal

Order Neutral—Input order is different but order does not matter

Order—Nodes match but order is wrong and matters

Incomplete—Some steps towards goal or target present

Corrected—Input nodes include steps that were later undone or corrected

Tutored—Matches verbatim because the tutor performed the problem/task (hit Solve-It button)

Non-Standard—Valid input, but not standard

NoMatch—Input does not match on any criteria

A measure of user mastery can take into account the accuracy of the user's solution. Of course, even a skilled user may occasionally make mistakes; hence, the measure of user mastery can take into account history of the user's accuracy. As one example, a measure of user mastery can be represented by a sigmoid function. As an example, the mastery M can be given by the equation $$M = \left| \frac{1}{1 + e^{-ax}} \right|$$

Wherein x is the number of correct responses, and a is a coefficient. Different values of the coefficient a can be useful. For example, a=0.1 gives a mastery of about 70% after 8 consecutive correct solutions, 80% after 14, and 90% after 22. The coefficient value can also be adjusted, for example, based on user demographic information, difficulty of subject matter, or other factors. The initial value of x can be set to zero, or other value, for example based on user demographic information, or user self-assessment input.

If desired, a history of user answers can be stored. For example, a bit string, having 0 for incorrect answers and 1 for correct answers can be built up by appending a 0 or 1 to the bit string at each update. For example, a history string of "0010111000" represents two incorrect answers followed by one correct, one incorrect, three correct, three incorrect, etc. If desired, the history can be analyzed to determine information about the student's learning styles, number of repetitions until mastery, learning patterns, etc. Based on the results of such analysis, the coefficient can be adjusted accordingly.

The use of the sigmoid function as a measure of mastery can help to avoid penalizing an experienced user for the occasional mistake (e.g., a typographical error), while requiring a significant number of correct answers before mastery is obtained. For example, a user who starts at zero and answers few questions correctly will tend to remain at a low measure of mastery. On the other hand, a user who has a high number of correct answers will not be strongly penalized even if several mistakes are made.

One benefit of measuring mastery as described above is that only the number of correct responses, x, need be stored if desired. Accordingly, as a user answers questions, updates of the mastery measure can be less complex, since the value of x can be incremented or decremented.

As alluded to above, the curriculum can be divided into a number of different subject areas covering differing mathematical concept categories. For example, one example of a set of categories is:

Number representation (e.g., 23)

Addition without carry (e.g., 12+21)

Addition with carry (e.g., 45+9)

Chained problems (e.g., 123+32+202)

Subtraction without borrow (e.g., 7-2)

Subtraction with borrow (e.g., 21-19)

Mixed problems (e.g., 123-33+212)

Of course, additional and other categories can also be included. Many different arrangements of categories can be used, and it will be appreciated that the present invention is not limited to any particular arrangement. If desired, a hierarchical arrangement of mathematical concepts can also be defined, with sub-categories, super-categories, and multiple levels. For example, number representation of single digit, multiple digit, decimal, and positive and negative numbers can be sub-categories of the number representation category. Differing skill levels can also be measured. For example, tests can be presented which drawn from defined levels of performance (e.g., official soroban Kentei).

The series of mathematical problems to be solved can be adjusted based on user mastery. For example, a user can be presented a mix of problems from multiple concept categories (or problems covering more than one category simultaneously). For example, the series of mathematical problems can be selected randomly from a plurality of mathematical concept categories. A measure of mastery can be maintained for each of the categories. The probability of selecting from the various categories can be varied based on the measure of user mastery for each of the categories. For example, categories that have been mastered can have a lower probability, and categories that have not been mastered can have a higher probability. As a particular example, the probabilities can be set so that categories with a very low mastery (e.g., $x \leq 8$) are presented 60% of the time, partially mastered categories (e.g., $8 < x < 14$) are presented 25% of the time, and mastered categories (e.g., $x \geq 14$) are presented 10% of the time.

Available categories from which problems are selected can be adjusted based on what training the user has already been through. For example, a mathematical concept can be presented in a tutorial form, followed by a practice session in which problems to be solved are presented to reinforce the mathematical concept. During the practice session, user mastery can be measured. Upon achievement of a predefined level of user mastery, addition mathematical concepts can be presented in a tutorial form, followed by another practice session. Practice sessions can present problems selected to highlight the recently taught concept and can present problems testing previously taught concepts for reinforcement. When multiple concepts have been taught, mastery for each concept can be measured, and problems adjusted to provide greater practice in areas where the mastery is lower than other areas. As additional tutorials are worked through, additional categories of problems can be selected from for presentation to the user. During training, when user mastery for a particular concept falls below a threshold value, a tutorial associated with that concept can be initiated.

User reports can be generated. For example, a report can provide a listing of categories and the user mastery that has been obtained in each category. Categories can be presented in a predefined order, or sorted from high to low (or low to high) based on the mastery. As another example, user reports can be generated which show levels of mastery for multiple users of the system. For example, scoreboards or comparisons can be provided as a way of encouragement or competition.

Turning to the display aspects of the system, several different modes of display can be used. In some situations, a valuable aspect of training in the use of an abacus can be ensuring that the user is using proper hand positions and movements. Accordingly, in some embodiments, display of abacus operations can include display of animated hand positions. Furthermore, in some situations, display of just the hand positions and movements, without showing the corresponding bead movements, can be desirable for demonstration and testing of concepts.

For example, in teaching or tutoring a concept, the bead movements alone can be displayed. In such a situation, however, there is the possibility that the user will adopt an inefficient mode of hand movement to manipulate the beads. Accordingly, in addition to the bead movements being displayed, the corresponding hand movements can also be displayed simultaneously (e.g., overlaid on the bead movements). This can assist the user in developing proper technique. If desired, the hand movements alone can be displayed to emphasize this aspect of the training.

For testing comprehension of proper technique, a series of hand movements can be displayed without showing the abacus, and the user queried as to what mathematical operation is being displayed. User input can then be accepted and checked for accuracy. User input can be, for example, a text representation of the numbers or mathematical operations performed, or the bead movements that would have been performed.

As described above, a measure of mastery can be generated based on the accuracy of the user input, and additional testing, tutorials, or other functions can be triggered based on the mastery the user has achieved. Various techniques for accepting user input can be used, as described above.

Accordingly, in some embodiments, the system can include a database relating abacus operations and corresponding hand movements. The database can be used to covert a string of abacus operations to be displayed into corresponding hand movements. Animations of the corresponding hand movements can be generated and displayed.

Animations of the bead movements can also be generated and displayed. Accordingly, display can be of the hand movements only, bead movements only, or both the band movements and bead movements.

As described above, a string of abacus operations to be displayed can be represented as a text string, and converted into bead positions and bead movements.

It should now be appreciated that the system can provide for representation and display of abacus operations in multiple forms: text form, abacus bead positions and movements, and hand movements. Accordingly, in some embodiments, training can include presenting concepts using more than one display form, and providing output to the user in one form and requesting input in a different form. It is believed that using the combinations of modes (e.g., practicing movements and seeing actions replayed) involves multi-modal brain activity which enhances learning.

Figure 4:
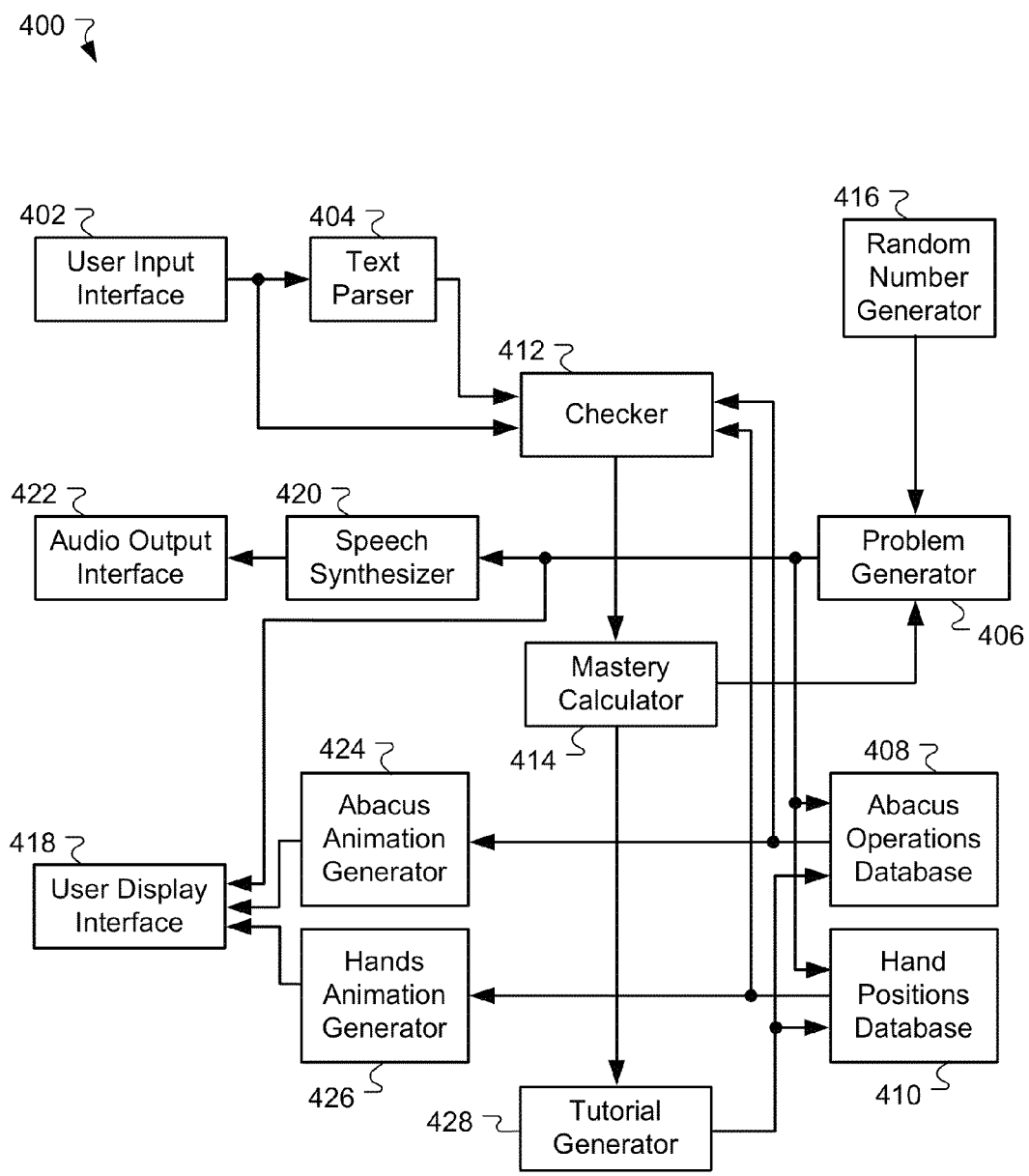
FIG. 4 is a block diagram of another computer-based abacus training system in accordance with some embodiments of the present invention.

Having described the capabilities of various embodiments of the system in general terms, one implementation of an abacus training system in accordance with some embodiments is shown in block diagram form in FIG. 4. The system, shown generally at 400, can include a number of modules, which can be implemented in hardware, software, or combinations thereof. The system can include a user input interface 402. For example, as described above, the user input interface can include a keyboard for text input, a mouse for manipulating screen controls (e.g., displayed abacus control, palette, and similar input control types), an abacus controller, a game controller, etc. The user input interface can include a software device driver for processing the user input into forms for use by other modules, such as object messages or operating system events. Examples of computer-based user input interface screens are provided by FIGS. 5-7.

User input in a text format can be provided to a text parser 404, which can operate to extract numerical values and mathematical operations.

The system 400 can include a problem generator 406, for example, for generating problems to be solved by the user. The problem generator can use a random number generator 416 for generating parameters of the generated problems, selecting problem types (e.g., categories), or both. The generated problems can be translated into corresponding abacus operations and hand positions for manipulating abacus beads using an abacus operations database 408 and hand positions database 410. For testing of a user, the corresponding abacus operations can be compared to user input using checker 412. Based on the accuracy of user input, a mastery calculator 414 can form one or more measures of user mastery. The user mastery can be provided to the problem generator 406 to allow for adjustment of the types of problems generated.

The checker 412 can be configured to perform bead-by-bead comparisons of user input for abacus operation input, for example as described above. As another example, the checker can include a Bayesian network, and perform Bayesian analysis, for example as described above.

Problems can be presented to the user in various ways. For example, a speech synthesizer 420 can be used to present problems to the user via an audio output interface 422. As another example, problems can be displayed to the user, via a user display interface 418. The audio output interface and user display interface can include a software driver for accepting output from other modules, such as object messages or operating system events. Examples of computer-based user output interface screens are provided by FIGS. 5-7.

Problems can be displayed in text, abacus format, hand animation display, or other formats. Animations of an abacus can be generated by abacus animation generator 424, based on output from the abacus operations database 408. Animations of hand movements can be generated by hand animation generator 426 based on output from the hand positions database 410.

Operation of the animation generators 424, 426 can use various techniques. For example, a series of images showing basic movements (e.g., thumb movements of various earth beads, index finger movement of heaven beads) can be strung together to show complex movements (e.g. clearing the abacus). As another example, animation can be performed based on computer-generated images of virtual models. For example, the abacus can be modeled as a series of geometric shapes in various positions, and displayable images generated by computer-based rendering of the model. Various animation techniques are known which can be used in embodiments of the present invention, and thus need not be described further.

The system can also include a tutorial generator 428. The tutorial generator can provide for teaching of various abacus operations via display of abacus animations, hand animations, or both. The tutorial generator can be triggered based on measures of user mastery, or via user input.

While FIG. 4 represents one implementation of a system in accordance with some embodiments of the present invention, it will be appreciated that other arrangements of the various modules can be used. For example, functions performed by different modules can be combined into a single module; and functions performed by illustrated modules can be split into separate modules. Different interfaces and data communications can be implemented between the modules.

As mentioned above, some of the modules can be implemented in software. For example, software can be in the form of computer-executable instructions in the form of object code generated from source code written in various languages (e.g., C, C++, C#, etc.). Modules can be implemented as objects in an object-oriented programming language. Databases can be defined using Structured Query Language (SQL) and compiled into computer-readable form. As another example, the computer-executable instructions can be in the form of Java instructions for execution on any computer having a Java Virtual Machine implementation. For example, portions of the user input interface and user display can be implemented as Java applets which are executed within a web browser. Other portions of the system can, for example, be implemented in a web server.

Modules can be implemented in hardware. For example, portions of the system can be implemented in discrete hardware, field programmable gate arrays (FPGAs), or application specific integrated circuits (ASICs).

While the discussion heretofore has principally focused on a user of the system, it will be appreciated that the system can accommodate multiple users. For example, the system can store measures of user mastery for each of a plurality of different users. Individual users of the system can be identified via a logon name and, if desired, an associated password.

Figure 5:
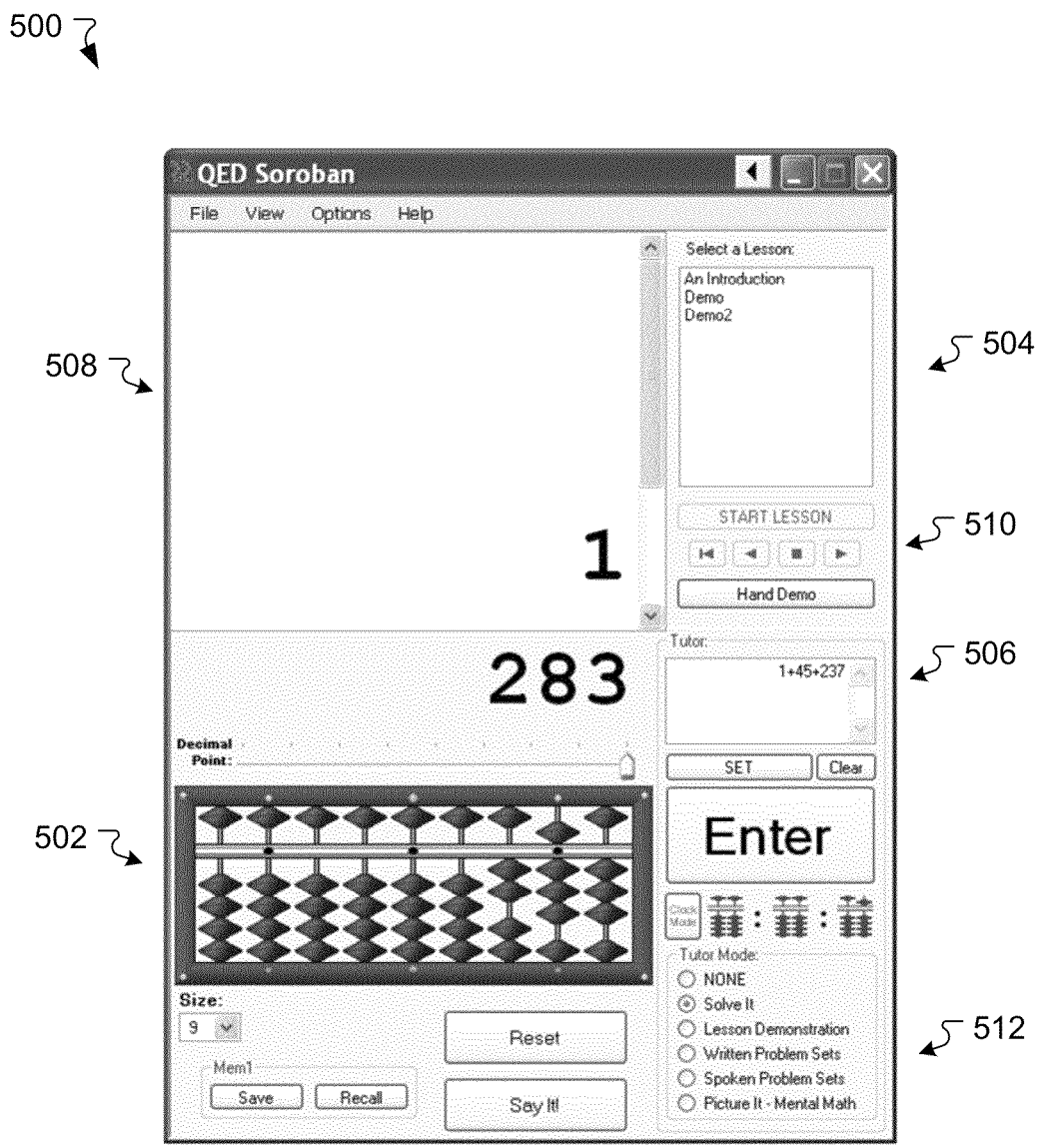
FIG. 5 is an illustration of a computer-displayed user interface in accordance with some embodiments of the present invention.

FIG. 5 illustrates a screen capture of a computer-based user interface in accordance with some embodiments of the invention. The user interface 500 can include a simulated abacus display 502. The simulated abacus can be used to provide output animations of bead movements or final abacus positions. The simulated abacus can also be used for input of abacus movements, for example, using a mouse to manipulate the individual beads. A listing window 504 can include a listing of tutorials which can be presented. A text input window 506 can be used for entry of text input (e.g., a mathematical problem to be solved such as 1+45+237 as shown here) or text output. A variety of other controls and display can be provided as well, including for example, a scratchpad window 508, controls 510 (e.g., for pausing, starting, stopping, rewinding, and advancing a tutorial), mode controls, and the like. Various aspects of the user interface display can be controlled or adjusted by the user, including for example, enabling and disabling portions of the display, changing the size of the abacus, and other features.

Figure 6:
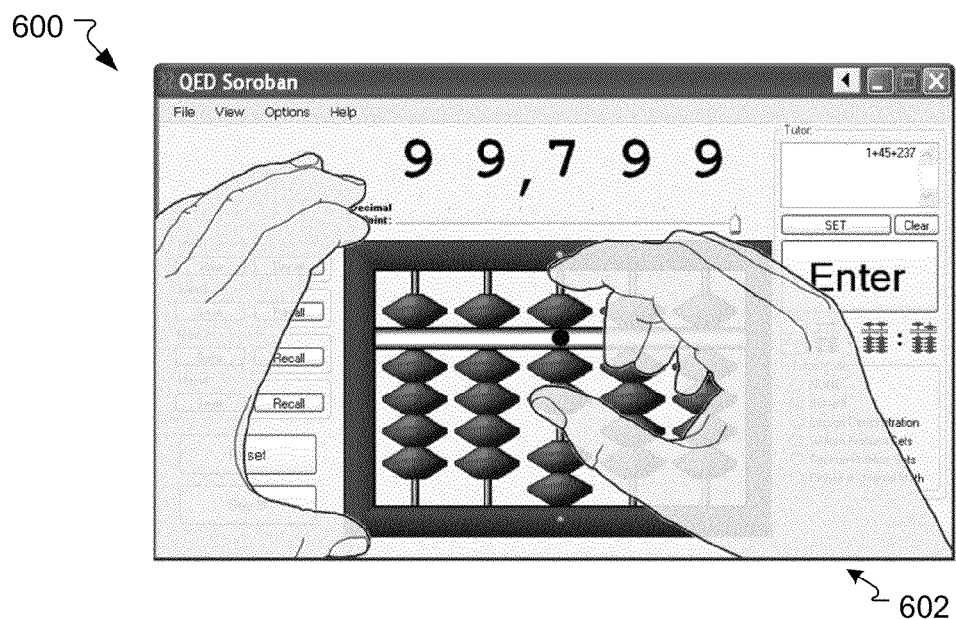
FIG. 6 is an illustration of another computer-displayed user interface in accordance with some embodiments of the present invention.

FIG. 6 illustrates another screen capture of a user interface in accordance with some embodiments of the invention. The user interface 600 can be seen as generally including similar features as in FIG. 5, although an animated hand 602 is also displayed showing the manipulation of the abacus beads. The animated hand display may be selectively enabled or disabled based on user request, tutorial mode, and testing mode.

Figure 7:
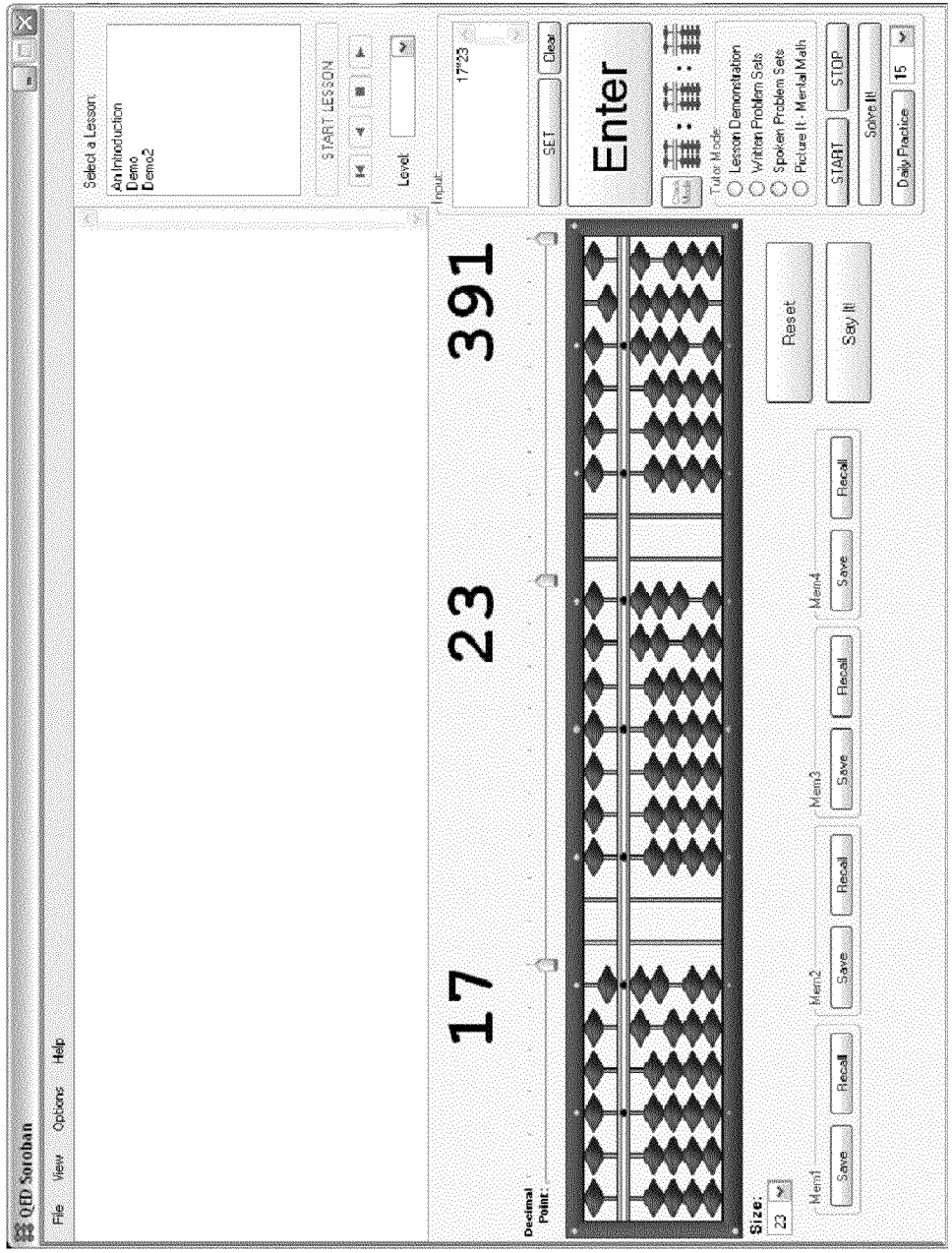
FIG. 7 is an illustration of yet another computer-displayed user interface in accordance with some embodiments of the present invention.

FIG. 7 illustrates yet another screen capture of a user interface showing use of the abacus for entry and manipulation of multiple numbers simultaneously. For example, in performing multiplication and division, some techniques involve manipulating two or more numbers on the abacus. Accordingly, an abacus display object can include controls to allow splitting the abacus object for multiple number entry, display, and control. As shown here, for example, multiplicands 17 and 23 are both stored on the abacus and used in computing the product 391.

Summarizing and reiterating to some extent, computer-based training systems and methods have been developed. Capabilities, such as display of hand movements corresponding to the bead movements, testing user comprehension of displayed hand movements, conversion between text-form and abacus-form representations, and adaptive training can be included.

While a number of illustrative applications have been illustrated, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

What is claimed is:

1. A method for displaying simulated abacus operations on a computer-driven display comprising:
accepting a string of abacus operations;
converting the string of abacus operations into a series of different hand positions and finger movements of human hands moving the beads of the abacus to execute the string of abacus operations;
generating hand animations of the human hands moving through the series of different hand positions and finger movements; and
displaying the hand animations on the computer-driven display, wherein the displaying the hand animations comprises displaying the hand animations but not displaying the abacus.

2. The method of claim 1, further comprising:
providing output to a user requesting the user to enter input describing a mathematical operation corresponding to the displayed animations;
accepting input from the user; and
comparing the input from the user to the string of abacus operations to determine the accuracy of the user input.

3. The method of claim 2, further comprising formulating a measure of user mastery based on the accuracy of the input from the user.

4. The method of claim 2, further comprising providing feedback to the user regarding the accuracy of the input from the user.

5. The method of claim 2, wherein the comparing the user input comprises:
forming a Bayesian network model of a mathematical problem corresponding to the string of abacus operations using a plurality of nodes, wherein each of the plurality of nodes corresponds to a mathematical concept and has a corresponding node probability;
pattern matching the input from the user to the plurality of nodes to obtain a comparison result;
evaluating the Bayesian network using the comparison result to obtain at least one updated node probability; and
formulating a measure of user mastery based on the at least one updated node probability.

6. The method of claim 1, wherein:
the string of abacus operations is represented as a text string, and
the method further comprises:
parsing the input text string to extract the numerical values and the mathematical operations;
converting the numerical values into abacus-form representations; and
converting the mathematical operations into a corresponding series of bead movements.

7. The method of claim 6, wherein the numerical values comprise base ten decimal numbers.

8. The method of claim 6, wherein the mathematical operations comprise any of addition, subtraction, multiplication, and division.

9. The method of claim 6, wherein the parsing the text string comprises:
identifying individual tokens within the text string;
categorizing each individual token as either a numerical value or a mathematical operation.

10. The method of claim 9, further comprising forming a tree-form representation of the text string using the tokens.

11. The method of claim 1 further comprising, after displaying the hand animations, displaying a query on the computer-driven display asking the user to identify a mathematical operation that corresponds to the hand animations.

12. A computer-based method for training a user in the operation of an abacus comprising:

generating a series of mathematical problems without displaying the mathematical problems to a user;
converting the mathematical problems into corresponding hand movements for manipulation of beads of the abacus;
generating animations of the corresponding hand movements;
displaying the animations to the user without displaying the mathematical problems to the user;
accepting user input describing the mathematical problems, which have not been displayed to the user;
comparing the user input to the mathematical problems to determine the accuracy of the user input;
formulating a measure of user mastery based on the accuracy of the user input; and
adjusting the series of mathematical problems based on the measure of user mastery.

13. The method of claim 12, wherein the accepting user input comprises accepting mouse manipulations of a displayed abacus control to define bead movements, and wherein the accepting mouse manipulations comprises accepting input of a plurality of numbers presented on the display abacus control.

14. The method of claim 12, wherein the accepting user input comprises accepting bead input from an abacus controller, and wherein the comparing the user input comprises checking each individual bead movement input by the user.

15. The method of claim 12, wherein the comparing the user input comprises:
forming a Bayesian network model of the mathematical problem using a plurality of nodes, wherein each of the plurality of nodes corresponds to a mathematical concept and has a corresponding node probability;
pattern matching the user input to the plurality of nodes to obtain a comparison result;
evaluating the Bayesian network using the comparison result to obtain at least one updated node probability; and
updating the measure of user mastery based on the at least one updated node probability.

16. The method of claim 12, wherein the generating a series of mathematical problems comprises selecting parameters of the mathematical problems randomly.

17. The method of claim 12, wherein the formulating a measure of user mastery comprises measuring user mastery corresponding to plurality of mathematical concept categories.

18. The method of claim 17, wherein the generating a series of mathematical problems comprises randomly selecting types of mathematical problems from the plurality of mathematical concept categories.

19. The method of claim 18, wherein the adjusting the series of mathematical problems comprises varying selection probabilities for the plurality of concept categories based on the measure of user mastery for each of the plurality of mathematical concept categories.

20. The method of claim 12, further comprising providing feedback to the user regarding the accuracy of the user input.

21. The method of claim 12, further comprising displaying a tutorial for a mathematical concept when the user mastery associated with the mathematical concept is below a threshold value.

22. The method of claim 12, further comprising storing measures of user mastery for each of a plurality of different users.

23. The method of claim 12, wherein:
the corresponding hand movements for manipulation of the beads comprises a series of different hand positions and finger movements of human hands moving the beads of the abacus to execute the mathematical problems, and
the animations are of the hand positions and finger movements.

24. A system for training a user in the operation of an abacus comprising:
means for generating a series of mathematical problems without displaying the mathematical problems to a user;
means for converting the mathematical problems into corresponding hand movements for manipulation of beads of an abacus;
means for generating animations of the corresponding hand movements;
means for displaying the animations to the user without displaying the mathematical problems to the user;
means for accepting user input describing the mathematical problems before the mathematical problems are displayed to the user;
means for comparing the user input to the mathematical problems to determine the accuracy of the user input;
means for formulating a measure of user mastery based on the accuracy of the user input; and
means for adjusting the series of mathematical problems based on the measure of user mastery.

25. The system of claim 24, wherein the means for formulating a measure of user mastery comprises means for measuring user mastery corresponding to plurality of mathematical concept categories.

26. The system of claim 25, wherein the means for generating a series of mathematical problems comprises means for randomly selecting types of mathematical problems from the plurality of mathematical concept categories.

27. The system of claim 26, wherein the means for adjusting the series of mathematical problems comprises means for varying selection probabilities for the plurality of concept categories based on the measure of user mastery for each of the plurality of mathematical concept categories.

* * * * *